United States Patent
Carr et al.

(10) Patent No.: US 10,916,110 B2
(45) Date of Patent: Feb. 9, 2021

(54) EMERGENCY LIGHTING, EVACUATION, AND RESCUE ROUTING WITH POWER OVER-ETHERNET

(71) Applicant: ABB Schweiz AG, Baden (CH)

(72) Inventors: Joseph Alexander Carr, Raleigh, NC (US); Zhenyuan Wang, Morrisville, NC (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/908,311

(22) Filed: Feb. 28, 2018

(65) Prior Publication Data

US 2020/0020213 A1  Jan. 16, 2020

Related U.S. Application Data

(63) Continuation of application No. PCT/US2015/047804, filed on Aug. 31, 2015.

(51) Int. Cl.
*G08B 7/06* (2006.01)
*H04L 12/10* (2006.01)

(52) U.S. Cl.
CPC .............. *G08B 7/066* (2013.01); *G08B 7/06* (2013.01); *H04L 12/10* (2013.01)

(58) Field of Classification Search
CPC .......... G08B 7/06; G08B 7/062; G08B 7/064; G08B 7/066; G08B 21/02; H04W 4/024; H04W 4/33; H04W 4/38; H04W 76/50; H04L 12/10
See application file for complete search history.

(56) References Cited

U.S. PATENT DOCUMENTS

| | | | |
|---|---|---|---|
| 8,457,793 | B2 | 6/2013 | Golding et al. |
| 2005/0229016 | A1 | 10/2005 | Addy |
| 2006/0281435 | A1* | 12/2006 | Shearer ............. G06K 19/0707 455/343.1 |
| 2008/0197790 | A1 | 8/2008 | Mangiaracina et al. |
| 2008/0137589 | A1 | 12/2008 | Barret |
| 2009/0050591 | A1* | 2/2009 | Hart ..................... H05K 7/1497 211/162 |
| 2013/0053063 | A1* | 2/2013 | McSheffrey ........ H04W 64/006 455/456.1 |

(Continued)

OTHER PUBLICATIONS

International Search Report and Written Opinion issued in corresponding international application No. PCT/US2015/047804, dated Jan. 11, 2016, 14 pp.

(Continued)

*Primary Examiner* — Van T Trieu
(74) *Attorney, Agent, or Firm* — Taft Stettinius & Hollister LLP; J. Bruce Schelkopf

(57) ABSTRACT

Systems, apparatus, and methods are disclosed for emergency lighting and evacuation. A building may include several emergency lighting stations in which at least some, if not all, of the lighting station includes a lighting device, a motion sensor, a speaker, a video camera, and a wireless access point. A controller adapter may provide power to and communicate with the lighting stations via Power-over-Ethernet (PoE) connections. A central controller may communicate with the controller adapter to control the emergency lighting stations through the PoE connections.

19 Claims, 3 Drawing Sheets

(56) References Cited

U.S. PATENT DOCUMENTS

| | | | | |
|---|---|---|---|---|
| 2013/0245932 A1* | 9/2013 | Beaurepaire | ........... | G01C 21/20 |
| | | | | 701/409 |
| 2014/0036500 A1* | 2/2014 | Eggleton | ................... | F21V 3/08 |
| | | | | 362/235 |
| 2014/0139539 A1 | 5/2014 | Byers | | |
| 2014/0191875 A1* | 7/2014 | Wedig | ................... | G08B 7/066 |
| | | | | 340/628 |
| 2014/0340222 A1* | 11/2014 | Thornton | ................ | G08B 7/062 |
| | | | | 340/539.17 |
| 2014/0341588 A1 | 11/2014 | Pederson | | |
| 2015/0091451 A1* | 4/2015 | Williams | ................ | H02J 9/065 |
| | | | | 315/160 |

OTHER PUBLICATIONS

Axis Communications, "Power over Ethernet," 2014. Online: http://www.axis.com/products/video/about_networkvideo/boe.htm.

Philips, "Philips gives workers smartphone control of office lighting with groundbreaking connected lighting system," Mar. 27, 2014. Online: http://www.newscenter.philips.com/main/standard/news/press/2014/20140327-Philips-gives-workers-smartphone-control-of-office-lighting-with-groundbreaking-connected-lighting-system.wpd#.U8AJlJRdVHX.

Weidmuller, "Power over Ethernet switches and industrial Ethernet WLAN module," 2014. Online: http://www.weidmueller.com/76289/Products/Product-News/Electronics/Power-over-Ethernet-switches-and-Industrial-Ethernet-WLAN-module/cw_index_v2.aspx.

ABB, "System 800xA Safety Overview," 2012. Online: http://www05.abb.com/global/scot/scot343.nsf/veritydisplay/0f2e455ab6dbb4a7c12579dt003e2452/$file/3BSE038820_D_en_System_800xA_Safety_-_Overview.pdf.

International Preliminary Report on Patentability issued in corresponding international application No. PCT/US2015/047804, dated Mar. 6, 2018, 9 pp.

* cited by examiner

EMERGENCY LIGHTING, EVACUATION, AND RESCUE ROUTING WITH POWER OVER-ETHERNET

CROSS REFERENCE TO RELATED APPLICATIONS

The present application claims the benefit of PCT application number PCT/US2015/047804, filed Aug. 31, 2015, which is incorporated herein by reference in its entirety.

BACKGROUND

The present application generally relates to an emergency response system, and in particular relates to an emergency response system that provides evacuation information. Safety control systems may be used in industrial plants to manage industrial processes during emergency situations. The safety control systems may provide alternative control signals for the equipment during the emergency and may log critical information during the emergency event. These safety control systems also sometimes transmit logged data to an off-site facility for remote service or for data-backup purposes. A building emergency lighting and siren system is currently used to identify a preplanned evacuation route with lights and verbal directions. However, this evacuation route may become unusable due to circumstances in the event, such as a door becoming blocked by debris. The current building emergency lighting and siren system has no way to identify these changes in circumstance or convey them to the occupants. Another feature of current building emergency system is that they have no way of determining whether the building has been completely evacuated. Evacuation procedures will usually include a rendezvous point and census system to confirm that all occupants have left the building. This can be inadequate to locate visitors or service personnel such as vending machine delivery people. Furthermore, if an occupant is trapped, there is no way to locate them without a manual search team. Therefore, a need exists for further technological developments in the area of emergency response systems.

SUMMARY

One embodiment is a unique system, components, and methods for emergency response systems. Other embodiments include apparatuses, systems, devices, hardware, methods, and combinations for emergency response systems. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE FIGURES

The description herein makes reference to the accompanying figures wherein like reference numerals refer to like parts throughout the several views, and wherein.

DESCRIPTION OF ILLUSTRATIVE EMBODIMENTS

Figure 1:
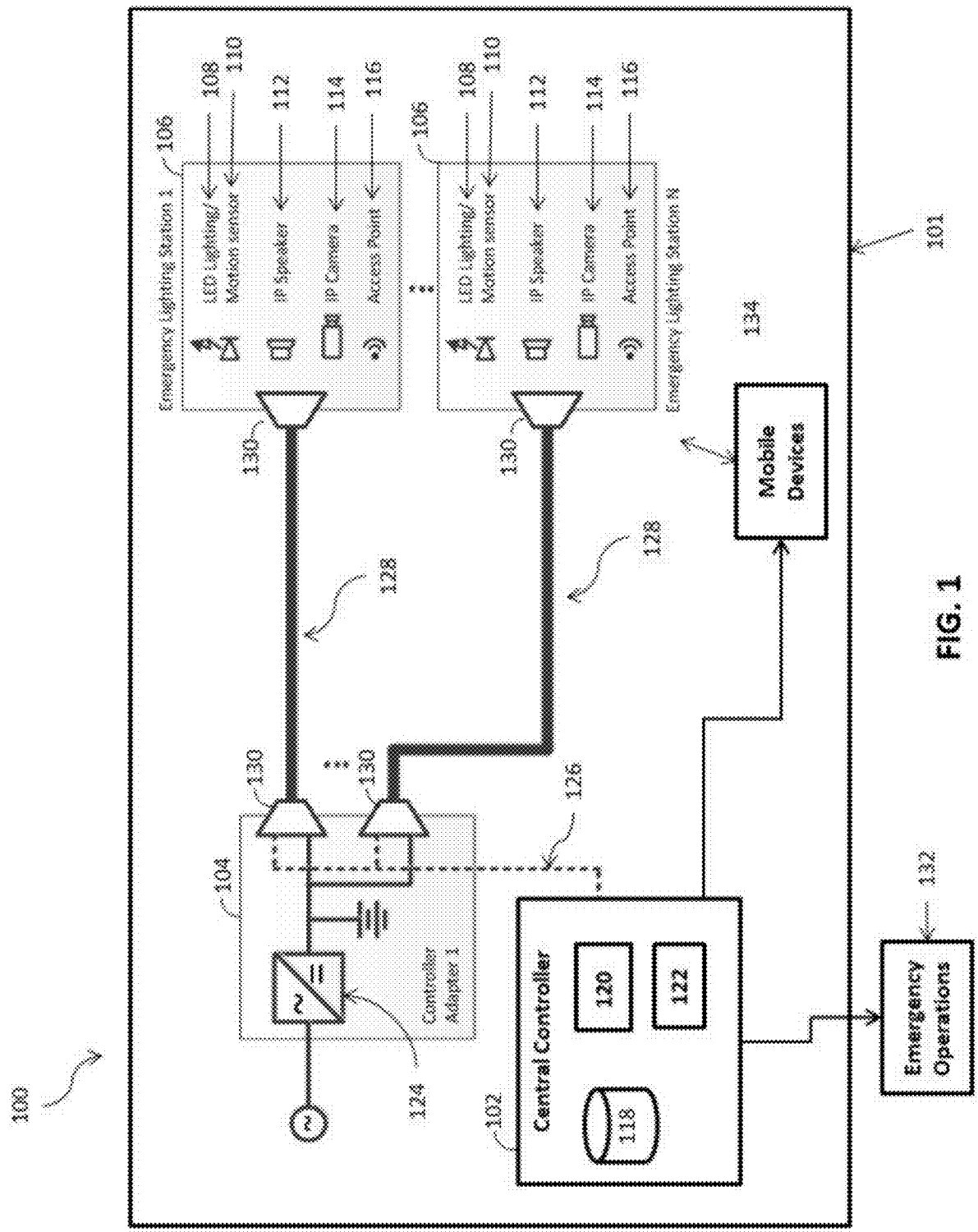
FIG. 1 is a schematic view of an example emergency response system.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

With reference to FIG. 1, there is illustrated a schematic view of an emergency control and management system 100. The system 100 may be used during a power outage or emergency to route evacuees to safe exit points and to help emergency personnel to locate trapped occupants in a building 101.

The system 100 includes a central controller 102, one or more controller adapters 104, and one or more emergency lighting stations 106. Each of the emergency lighting stations 106 may include a lighting device 108, a motion sensor 110, an Internet Protocol (IP) speaker 112, an IP video camera 114, and/or a wireless local area network (WLAN) access point 116. It is contemplated that the emergency lighting stations 106 may include other components in other embodiments.

The central controller 102 is the brain of the safety/emergency control and management system 100. The central controller 102 is structured to coordinate evacuation and rescue operations. The central controller 102 includes a database 118 to log critical information, a web server 120 to provide information to building occupants and emergency management personnel, and an emergency response subsystem 122 to analyze the emergency situation and provide evacuation instructions and information to evacuees. It is contemplated that there may be multiple central controllers 102 that are located at different locations of the building 101 to provide redundancy in case one of the central controllers 102 is impacted by the emergency situation. It is further contemplated that a back-up central controller 102 may reside off-site that has a reliable Internet link to the controller adapter(s) 104.

The one or more controller adapters 104 are structured to provide power and data connections to the emergency lighting stations 106. The controller adapter 104 may include an uninterruptable power supply (UPS) 124 to provide power during power outages. The UPS 124 in the controller adapter 104 ensures that the connected PoE components (e.g., emergency lighting stations 106) remain powered during an emergency without the use of a battery. The emergency lighting stations 106 may be batteryless. The UPS 124 may be external to the controller adapter 104 in certain embodiments.

In the embodiment shown in FIG. 1, the controller adapter 104 communicates with the central controller 102 via an Internet Protocol (IP) data link or connection 126; however, other types of connections are contemplated. The controller adapter 104 communicates with each emergency lighting station 106 via a Power-over-Ethernet (PoE) connection 128. The controller adapter 104 and the emergency lighting stations 106 may include RJ45 ports 130 for the PoE connections 128. In this configuration, the central controller 102 is able to receive information from and control the various components in the emergency lighting stations 106 via the controller adapter 104. Thus, the PoE connections 128 provide power to the emergency lighting stations 106 as well as provide Ethernet-based communication with the central controller 102 via the controller adapter 104. The building 101 may include multiple controller adapters 104 depending on the number of emergency lighting stations 106 in the building 101 and the number of PoE ports (e.g., RJ45 ports) 130 the controller adapter(s) 104 may provide.

The emergency response subsystem 122 of the central controller 102 may receive information from the motion sensors 110 and the IP video cameras 114 and may process the information to locate trapped occupants, identify safe or accessible exit/evacuation routes, and/or identify blocked evacuation routes. The central controller 102 may communicate the location of trapped occupants and blocked access/ evacuation routes to emergency operations 132 such as first responders. The central controller 102 may also communicate this location information, safe exit routes, and/or blocked access route information to mobile devices 134 of occupants of the building 101. The central controller 102 may store the location of the trapped occupants and/or the blocked access routes in the database 118.

The central controller 102 may use the lighting device 108, IP speakers 112, and/or mobile device 134 updates to direct occupants to safe evacuation routes. The central controller 102 may communicate this information to the emergency operations 132 and mobile devices 134 via an Internet or cellular connection from the central controller 102 such as via the web server 120, or via the access points 116. It is contemplated that the central controller 102 may automatically detect and coordinate these functions. The mobile devices 134 may be smartphones, tablet computers, personal digital assistants, and the like.

The emergency lighting station 106 is a multi-purpose device that incorporates sensing (via IP camera 114 and motion sensor 110), actuating (via IP speaker 112 and lighting device 108), and communicating (via WLAN access point 116) functions. The lighting device 108 may be light emitting diode (LED) lights. The central controller 102 may control the operation of the lighting device 108 in various emergency modes to highlight evacuation routes and exits, and may be flashed in special patterns and/or colors to indicate contingency events such as a safe evacuation route or a blocked exit. The central controller 102 may also control the brightness of the light emitted from the lighting device 108 in a power outage, depending on if movement of an occupant is detected from the motion sensor 110. The lighting device 108 in the emergency lighting station 106 may operate and be controlled like a normal or traditional PoE light when an emergency is not occurring or in a non-emergency mode.

The IP cameras 114 and motion sensors 110 may be located at exits and along evacuation routes so that blocked routes may be identified by the central controller 102 and/or the IP cameras 114 or motion sensors 110. This information may then be communicated to the mobile devices 134 of occupants or emergency operations 132 personnel via the central controller's web server 120. The IP cameras 114 are used along with data from the motion sensors 110 and mobile device 134 app data to help locate trapped individuals. This information may be used to ensure that the building 101 is fully evacuated. The IP speakers 112 may be used to communicate evacuation routes and other emergency information to the occupants. The IP speakers 112 may double as a siren in a fire emergency.

The PoE connections 124 may enable the access points 116 to be placed in difficult to access areas with relatively minimal wiring work to provide wireless coverage throughout the building 101. The access points 116 of the emergency lighting stations 106 may provide the communication backbone for interfacing with the occupants' mobile devices 132. In an emergency, these access points 116 may be set to access the central controller's web server 120 only to allow the evacuation routes and other emergency information to be accessed efficiently by the occupants, and allow the rescue crews to communicate with the occupants via the central controller 102.

The circuitry in the central controller 102, controller adapters 104, and the emergency lighting stations 106 may be configured to provide appropriate signal conditioning to transmit and receive desired information (data), and correspondingly may include filters, amplifiers, limiters, modulators, demodulators, CODECs, digital signal processing, and/or different circuitry or functional components as would occur to those skilled in the art to perform the desired communications.

Figure 2:
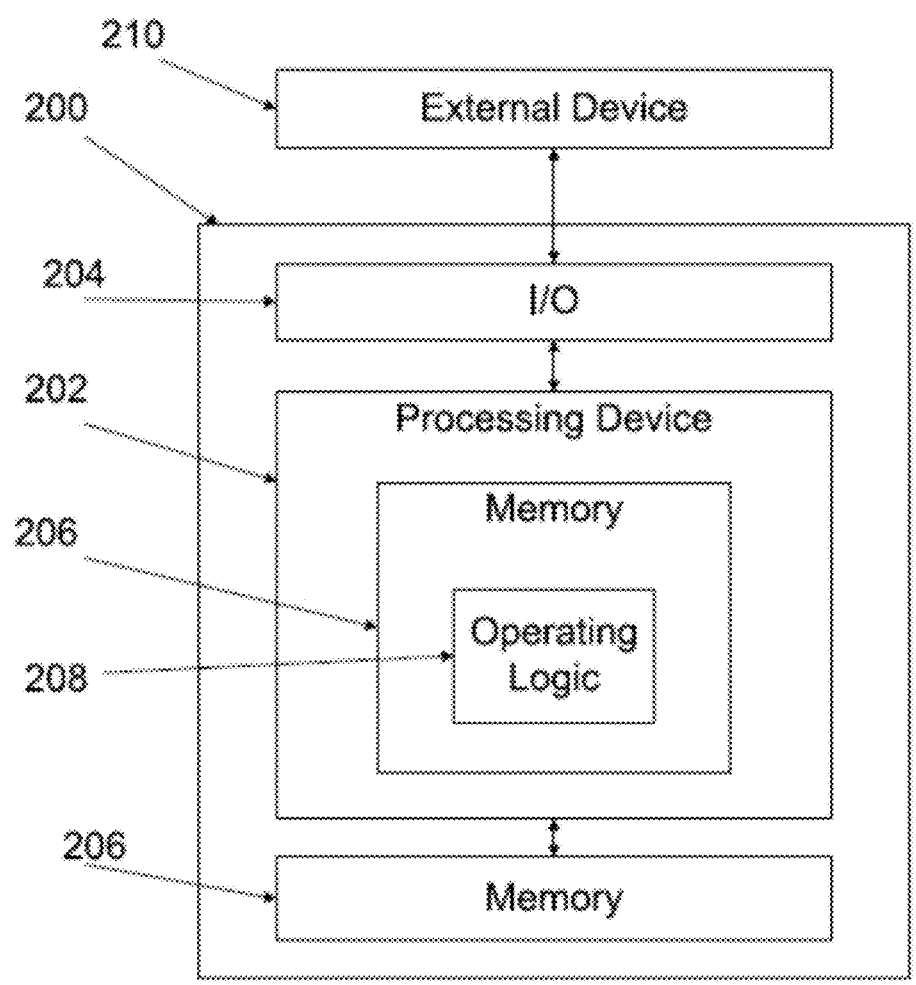
FIG. 2 is a schematic block diagram of an example central controller.

FIG. 2 is a schematic block diagram of one example of a central controller 200 such as the central controller 102 as shown in FIG. 1. The central controller 200 includes a processing device 202, an input/output device 204, memory 206, and operating logic 208. Furthermore, the central controller 200 communicates with one or more external devices 210.

The input/output device 204 allows the central controller 200 to communicate with the external device 210. For example, the input/output device 204 may be a transceiver, network adapter, network card, interface, or a port (e.g., a USB port, serial port, parallel port, an analog port, a digital port, VGA, DVI, HDMI, FireWire, CAT 5, or any other type of port or interface). The input/output device 204 may include hardware, software, and/or firmware. It is contemplated that the input/output device 204 will include more than one of these adapters, cards, or ports.

The external device 210 may be any type of device that allows data to be inputted or outputted from the central controller 200. For example, the external device 210 may be a controller adapter, an emergency lighting station, a switch, a router, a firewall, a server, a database, a mobile device, a networking device, a controller, a computer, a processing system, a printer, a display, an alarm, an illuminated indicator such as a status indicator, a keyboard, a mouse, or a touch screen display. Furthermore, it is contemplated that the external device 210 may be integrated into the central controller 200. It is further contemplated that there may be more than one external device in communication with the central controller 200.

Processing device 202 can be a programmable type, a dedicated, hardwired state machine, or any combination of these. The processing device 202 may further include multiple processors, Arithmetic-Logic Units (ALUs), Central Processing Units (CPUs), Digital Signal Processors (DSPs), or the like. Processing devices 202 with multiple processing units may utilize distributed, pipelined, and/or parallel processing. Processing device 202 may be dedicated to performance of just the operations described herein or may be utilized in one or more additional applications. In the depicted form, processing device 202 is of a programmable variety that executes algorithms and processes data in accordance with operating logic 208 as defined by programming instructions (such as software or firmware) stored in memory 206. Alternatively or additionally, operating logic 208 for processing device 202 is at least partially defined by hardwired logic or other hardware. Processing device 202 may include one or more components of any type suitable to process the signals received from input/output device 204 or elsewhere, and to provide desired output signals. Such components may include digital circuitry, analog circuitry, or a combination of both.

Memory 206 may be of one or more types, such as a solid-state variety, electromagnetic variety, optical variety, or a combination of these forms. Furthermore, memory 206 can be volatile, nonvolatile, or a combination of these types, and some or all of memory 206 can be of a portable variety, such as a disk, tape, memory stick, cartridge, or the like. In addition, memory 206 can store data that is manipulated by the operating logic 208 of processing device 202, such as data representative of signals received from and/or sent to input/output device 204 in addition to or in lieu of storing programming instructions defining operating logic 208, just to name one example. As shown in FIG. 2, memory 206 may be included with processing device 202 and/or coupled to the processing device 202.

Figure 3:
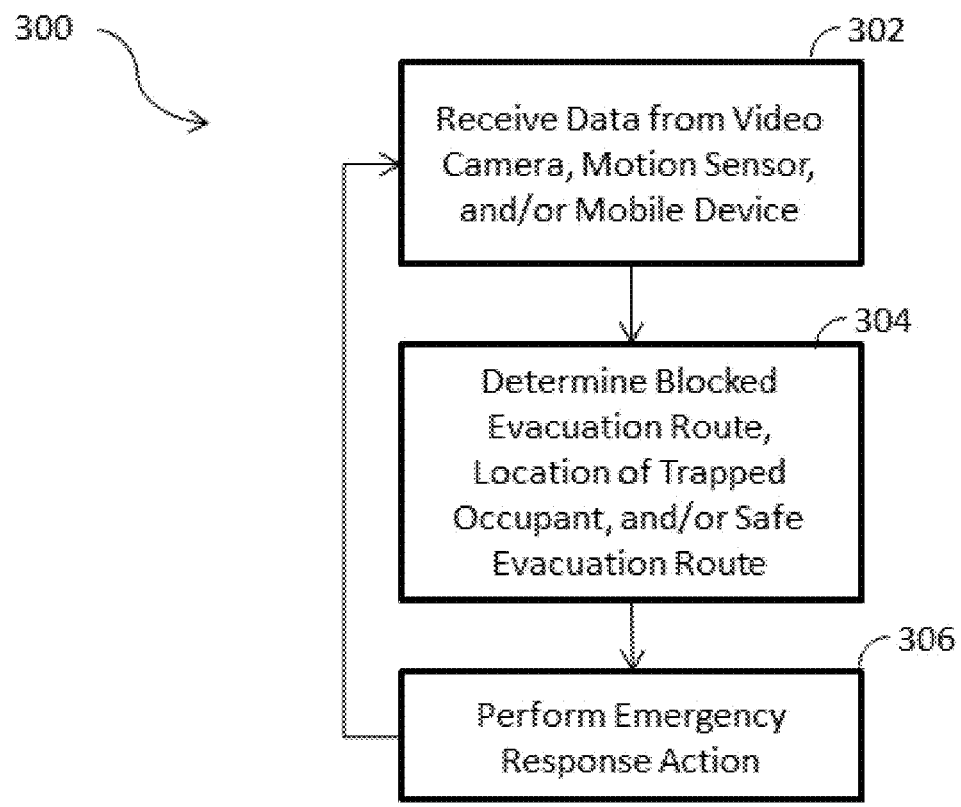
FIG. 3 is a flow diagram of an example procedure for emergency evacuation.

FIG. 3 illustrates a schematic flow diagram of an exemplary process 300 for emergency lighting and rescue operations with the central controller 102, controller adapter(s) 104, and the emergency lighting stations 106. Operations illustrated for all of the processes in the present application are understood to be examples only, and operations may be combined or divided, and added or removed, as well as re-ordered in whole or in part, unless explicitly stated to the contrary.

Process 300 begins at operation 302 in which the central controller 102 receives data from various components in the emergency lighting stations 106 such as the video camera 114 and the motion sensor 110. The central controller 102 may also receive mobile usage data about a mobile device 134 of a trapped occupant from the access point 116.

Process 300 then proceeds from operation 302 to operation 304. At operation 304, the emergency response subsystem 122 of the central controller 102 is configured to determine blocked evacuation route, locations of trapped occupants, and/or safe evacuation route for trapped occupants based on the data received in operation 302.

Process 300 then proceeds from operation 304 to operation 306. At operation 306, the central controller 102 may perform one or more emergency response actions based on the information determined in operation 304. For example, the central controller 102 may control the lighting device 108 in certain patterns and/or colors to indicate a safe evacuation route or a blocked evacuation route. The central controller 102 may also control the speakers 110 to announce a safe evacuation route or blocked evacuation route. The central controller 102 may also transmit safe evacuation route information or blocked evacuation route information to the mobile device 134. The information transmitted to the mobile device 134 may be particular to the mobile device 134 based on the location of the mobile device 134 and the trapped occupant. The central controller 102 may also transmit blocked evacuation route information and/or trapped occupant information to emergency operations 132 such as first responders. Process 300 then returns to operation 302.

The various aspects of the processes in the present application may be implemented in operating logic 208 as operations by software, hardware, artificial intelligence, fuzzy logic, or any combination thereof, or at least partially performed by a user or operator. In certain embodiments, operations represent software elements as a computer program encoded on a non-transitory computer readable medium, wherein the central controller 102 performs the described operations when executing the computer program.

It is contemplated that the various aspects, features, computing devices, processes, and operations from the various embodiments may be used in any of the other embodiments unless expressly stated to the contrary.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system for emergency evacuation of an occupant trapped in a building, the system comprising:
   a plurality of lighting stations, at least two lighting stations of the plurality of lighting stations having a lighting device, at least one sensor, and a wireless access point;
   a controller adapter to provide power to, and communicate with, the plurality of lighting stations, the controller adapter further including an uninterruptible power supply that is adapted to continue to provide power from the controller adapter to the plurality of lighting stations during a power outage and without use of a battery; and
   a central controller in communication with the controller adapter and the wireless access point, the wireless access device configured to communicate information between the central controller and a mobile device of the occupant, the central controller configured to:
   receive data from the at least one sensor of the at least two lighting stations;
   determine, based on the received data, a location of the occupant;
   identify, based on the received data, one or more of a plurality of evacuation routes in the building that is unavailable for passage by the occupant;
   determine, based on the identified one or more evacuation routes that are unavailable for passage and the plurality of evacuation routes, at least one available evacuation route;
   determine, based on the identified at least one available evacuation route and the determined location of the occupant, an accessible evacuation route for the occupant; and
   control the lighting of the lighting device of at least one of the plurality of lighting stations to visually identify the accessible evacuation route,
   wherein the system is configured to limit, during emergency evacuation, information from the central controller that is accessible through the wireless access point by the mobile device.

2. The system of claim 1, wherein the central controller includes a web server configured to transmit the accessible evacuation route to the mobile device of the occupant, and wherein the at least one sensor further comprises at least one of the following: a video camera and a motion sensor.

3. The system of claim 2, wherein the central controller further receives mobile usage data of the mobile device from the wireless access point of at least one of the plurality of lighting stations, wherein the location of the occupant is further determined based on the mobile usage data, and wherein the controller adapter provides power to, and communicates with, the plurality of lighting stations via Power-over-Ethernet (PoE) connections.

4. The system of claim 1, wherein the central controller is further configured to store the location of the occupant in a database, and wherein at least one lighting station of the plurality light stations further includes at least one of the following: a motion sensor, a speaker, and a video camera.

5. The system of claim 4, wherein the central controller is further configured to transmit the location of the occupant to emergency operations.

6. The system of claim 1, wherein the central controller is further configured to control a speaker of at least one of the plurality of lighting stations to identify the accessible evacuation route.

7. The system of claim 1, wherein the central controller is further configured to control the lighting of the lighting device and a speaker of at least one of the plurality of lighting stations to identify the one or more of the plurality of evacuation routes in the building that is unavailable for passage.

8. The system of claim 1, wherein each of the plurality of lighting stations is batteryless.

9. The system of claim 1, wherein the lighting device in at least one of the plurality of lighting stations operates as a normal lighting device in a non-emergency mode.

10. A non-transitory computer readable medium that stores instructions to perform a method for emergency evacuation of an occupant trapped in a building, the method comprising:
communicating with a plurality of lighting stations via a controller adapter, each of the plurality of lighting stations having an access point;
transmitting, from the controller adapter to each of the plurality of lighting stations, power to control the plurality of lighting stations, wherein at least two lighting stations of the plurality of lighting stations having a lighting device and at least one sensor, and wherein the controller adapter includes an uninterruptible power supply that is adapted to continue to provide power from the controller adapter to the plurality of lighting stations during a power outage and without use of a battery;
receiving, by a central controller from the access point of at least one of the at least two lighting stations, information detected by the at least one sensor of the at least two lighting stations;
identifying, by the central controller and using the received information, a blocked evacuation route and a location of the occupant;
determining, based on the identified blocked evacuation route and the identified location of the occupant, an accessible evacuation route;
limiting, after identification of the blocked evacuation route, information accessible from the central controller through the access point of the at least one of the at least two lighting stations by a mobile device of the occupant; and
controlling the lighting of the lighting device of at least one of the plurality of lighting stations to visually identify the determined accessible evacuation route.

11. The non-transitory computer readable medium of claim 10, wherein the method further comprises:
transmitting the accessible evacuation route to the mobile device of the occupant with a web server of the central controller.

12. The non-transitory computer readable medium of claim 10, wherein the method further comprises:
controlling a speaker of at least one of the plurality of lighting stations to announce the accessible evacuation route.

13. The non-transitory computer readable medium of claim 10, wherein the access point for each of the plurality of lighting stations is a wireless access point, and wherein the method further comprises:
receiving mobile usage data of the mobile device of the occupant from the wireless access point of at least one of the plurality of lighting stations;
receiving motion data from a motion sensor of at least one of the plurality of lighting stations; and
identifying the location of the occupant based on at least the mobile usage data and the motion data.

14. The non-transitory computer readable medium of claim 10, wherein the method further comprises:
transmitting the location of the occupant to emergency operations.

15. A non-transitory computer-readable medium for emergency evacuation of an occupant trapped in a building, comprising instructions stored thereon, that when executed on a processor of a central controller, perform the steps of:
communicating with a plurality of lighting stations via a controller adapter, wherein the controller adapter being structured to provide power to and control each of the lighting stations, wherein each lighting station includes lighting, a motion sensor, a speaker, a video camera, and a wireless access point, and wherein the controller adapter includes an uninterruptible power supply that is adapted to continue to provide power from the controller adapter to the plurality of lighting stations during a power outage and without use of a battery;
receiving video data from the video cameras;
receiving motion data from the motion sensors;
receiving mobile usage data of a mobile device of the occupant from the wireless access point of at least one of the lighting stations;
determining a blocked evacuation route based on the video data;
determining a location of the occupant based on the video data, the motion data, and the mobile usage data;
determining an accessible evacuation route for the occupant based on the location of the occupant and the blocked evacuation route;
transmitting the accessible evacuation route to the mobile device of the occupant via a web server;
controlling the speaker of at least one of the lighting stations to identify the accessible evacuation route;
controlling the lighting of at least one of the lighting stations to identify the accessible evacuation route; and
communicating information from the web server accessed through the wireless access port by a device of the occupant, wherein the information accessible through the wireless access port is limited in response to detection of an emergency situation.

16. The computer-readable medium of claim 15, further comprising:
transmitting the location of the occupant to emergency operations.

17. The computer-readable medium of claim 15, further comprising:
   controlling the lighting and the speaker of at least one of the plurality of lighting stations to identify the blocked evacuation route.

18. The computer-readable medium of claim 15, wherein each of the plurality of lighting stations is batteryless.

19. The computer-readable medium of claim 15, further comprising:
   controlling the lighting in at least one of the plurality of lighting stations to operate as normal lighting in a non-emergency mode.

\* \* \* \* \*